Oct. 31, 1961   H. GUYER   3,006,704
PISTON RING
Filed Nov. 12, 1959   3 Sheets-Sheet 1

Oct. 31, 1961　　　　H. GUYER　　　　3,006,704
PISTON RING

Filed Nov. 12, 1959　　　　　　　　3 Sheets-Sheet 2

Oct. 31, 1961  H. GUYER  3,006,704
PISTON RING

Filed Nov. 12, 1959  3 Sheets-Sheet 3

United States Patent Office 3,006,704
Patented Oct. 31, 1961

3,006,704
PISTON RING
Henry Guyer, Zurich, Switzerland, assignor to Nova-Werke Junker & Ferber, Zurich, Switzerland
Filed Nov. 12, 1959, Ser. No. 852,306
Claims priority, application Switzerland Nov. 20, 1958
17 Claims. (Cl. 309—29)

The present invention relates to a piston ring assembly comprising a piston ring proper and a loading spring arranged on the inside thereof and increasing in operation the radial loading thereof.

The invention has the main object of providing a self-contained assembly which is independent of the bottom of the groove in the piston in which the said assembly is fitted. Another object of the invention is to provide a piston ring assembly which is lighter in weight than the usual assemblies of this kind. It is a further object of the invention to provide a piston ring assembly which produces a maximum specific pressure of the piston ring at a minimum weight of material. It is yet another object of the invention to provide a loading spring of a piston ring assembly which can be assembled with an existing piston ring and fitted into any existing groove in the piston without necessitating any deeper cutting of the said groove. It is still another object of the invention to provide a piston ring assembly the loading spring of which is practically indestructible in operation, since in the loaded condition it hugs the inside of the associated piston ring.

With these and other objects in view which will become apparent later from this specification and accompanying drawings, I provide a piston ring assembly comprising in combination: a piston ring and a loading spring, which bears on the said piston ring from inside, the said loading spring and piston ring forming together a self-contained unit independent of the bottom of the groove for the said piston ring. The ends of the said loading spring preferably bear on one another at least in the loaded condition. The said loading spring preferably forms a polygon line in the loaded as well as in the unloaded condition, but may alternatively form an ellipse in the unloaded and a circle in the loaded condition. Instead of bearing on one another the ends of the said loading spring may bear on the inside of the piston ring both adjacent the same side of the butt joint of the piston ring. The loading spring may be made from spring strip material, perforated transversely cambered, of V-profile or of trapezium profile if desired, or of spring wire material. If forming a polygon, the butt joint of the piston ring may be bridged over by a polygon side or coincide with a polygon corner. The polygon sides may be curved convexly or otherwise be made of less buckling resistance outwardly, so that they buckle outwardly under radial loading and form additional support points on the inside of the piston ring.

In the accompanying drawings embodiments of the invention are illustrated by way of example, in which:

FIGS. 9–14 show by way of example various profiles of strip-shaped loading springs.

FIG. 16 is a partial view of a perforated steel ring.

Figure 1:
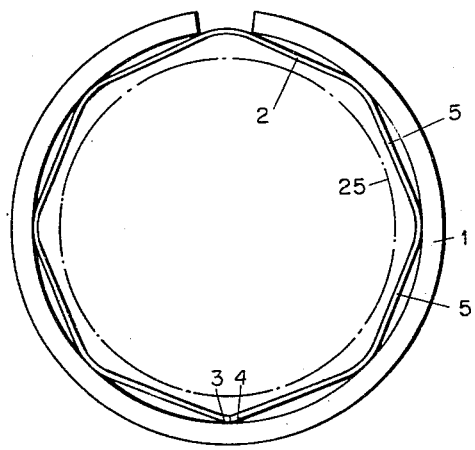
FIG. 1 shows an unloaded piston ring with loading spring in plan view.

As shown in FIG. 1, the loading spring 2 is inserted into the piston ring 1 in such a manner that the two ends 3 and 4 of the loading spring abut one another and mutually support each other. The loading spring which is here shown as a strip of spring steel may alternatively be made of spring steel wire (round profile) [FIG. 15] or a perforated steel strip [FIG. 16] may be used. Features of the loading spring 2 are its polygonal shape and the mutual support of the ends 3 and 4 of the spring. The maximum length of the loading spring 2 as a polygon line is geometrically determined by the inner diameter of the piston ring.

Figure 2:
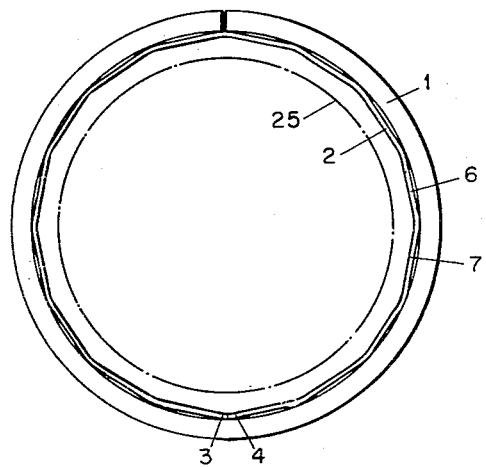
FIG. 2 shows a closed, loaded piston ring with the loading spring inserted.

From FIG. 2 it can be seen how the loading spring 2 is deformed when the piston ring is loaded, i.e. compressed. It is essential that the loading spring must not touch the bottom of the groove indicated by the chain-dotted circle line 25 either in the loaded or in the unloaded condition of the piston ring 1, i.e. that it forms a machinery element independent of the bottom of the groove in the piston ring.

When the loading spring 2 consists in the unloaded condition in a polygon line of $n$ sides, the loaded loading spring 2 in the piston ring when the latter is compressed is deformed into a polygon of $2n$ sides. It is, however, also possible that the polygon line of $n$ sides is deformed into an $nn$-sided polygon, wherein $n$ may have any numerical value desired.

Figure 3:
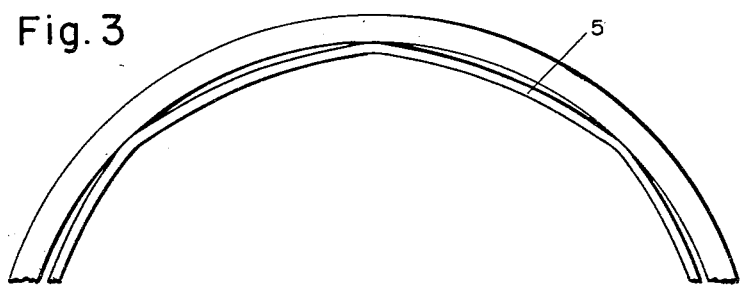
FIG. 3 shows on a larger scale the shape of the loading spring as inserted in an open piston ring.

Since in the unloaded or quasi unloaded condition of the loading spring the ends 3 and 4 of the spring mutually support one another, the space of the loading spring is reduced when the piston ring 1 is compressed. The unaltered length of the compression spring must be capable of giving way, and the sides 5 of the polygon line are loaded in buckling. When the sides 5, as illustrated in FIG. 3, are curved slightly convex relative to the centre of the piston ring they buckle under a buckling load with certainty outwardly when the piston ring is compressed. The $n$-sided polygon is deformed into a $2n$-sided polygon, and from each side 5 the two sides 6 and 7 originate. The new corners thus formed also abut the piston ring. Instead of obtaining a $2n$-sided polygon alternatively a $3n$-, $4n$-, etc. sided polygon, i.e. an $nn$ sided polygon may be attained.

This fact is a great advantage, since the more corners of the loading spring 2 help to support the piston ring 1, the more uniformly the piston ring seals against the cylinder wall.

One may conceive the polygon line enlarged mathematically in such a manner that it makes transition into an ellipse. The same is then deformed into a circle by hugging the piston ring.

Figure 4:
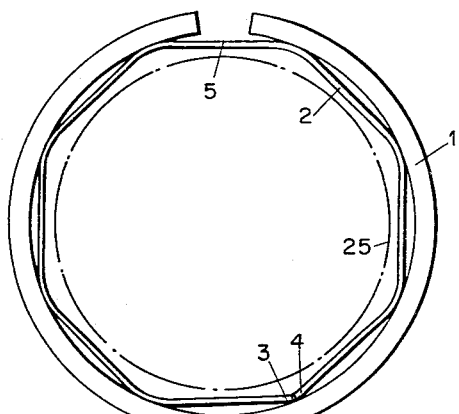
FIG. 4 shows in contrast to the loading spring shown in FIGS. 1 and 2 another position thereof with respect to the butt joint of the open piston ring.

As will be seen in FIG. 1, one corner of the unloaded loading spring 2 lies in the plane of the butt joint of the piston ring. The loading spring 2 may however lie alternatively within the piston ring 1 as shown in FIG. 4 where one polygon side lies in the plane of the butt joint of the piston ring. The piston ring loading spring lying in the piston ring 1 as shown in FIG. 4 is again deformed as shown in FIG. 2 when the piston ring 1 is compressed. In both cases the butt joint ends of the piston ring 1 are specially supported by the loading spring 2 in the loaded condition.

The ends 3 and 4 of the loading spring may also be designed as a special lock.

Figure 5:
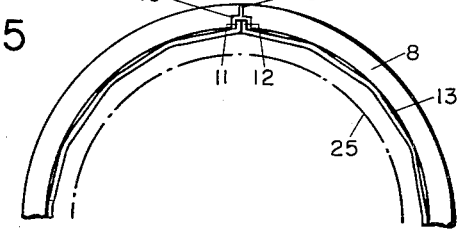
FIGS. 5–7 show by way of example various embodiments of the ends of the loading spring. The lock of the loading spring may be designed at will.

FIG. 5 shows a closed (i.e. compressed) piston ring 8, which has a recess 10 on each of its butt ends 9. In these recesses 10 lie the outwardly bent ends 11 and 12 of the loading spring 13. The ends 11 and 12 of the spring mutually support one another. Care has to be taken that the two recesses are large enough for the ends 11 and 12 of the loading spring to play freely even when the piston ring 8 is compressed, with a given clearance of the butt ends.

Figure 6:
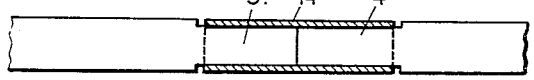
Figure 6A:

Another embodiment of the ends of the springs is shown in FIGS. 6 and 6a. The ends 3 and 4 are stepped as shown in FIG. 6. A shallow sleeve 14 (FIG. 6a) is pushed over as a lock, the inner shape of which sleeve corresponds to the ends 3 and 4 of the loading spring.

Figure 7:
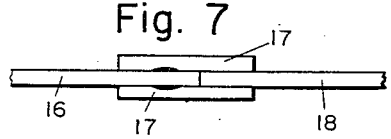

FIG. 7 shows the design of the ends of the loading spring as a special lock; the latter may form a corner of the unloaded polygon line or may lie within a side of the unloaded polygon.

The lock may for example be designed as follows: on to the end 16 of the loading spring on both the outside and inside of the spring strip a small piece 17 of spring strip is welded by spot welding on to the end 16 of the loading spring in such a manner that the two pieces 17 of spring strip protrude each about 2 mm. beyond the end 16 of the loading spring. When inserting the loading spring the polygon line is then closed when the end 18 of the loading spring is fitted into the gap formed by the pieces of spring strip 17 in such a manner that the two ends 16 and 18 abut closely one another.

Figure 15:
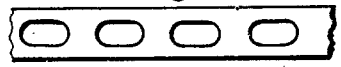
FIG. 15 is a cross-section through a further modification.

When using a wire as the loading spring the lock is reduced to a tubular piece into which both ends of the loading spring are pushed. A section through this embodiment is shown in FIG. 15, the reference character 30 designating the steel wire and 31 the tubular piece.

Figure 8:
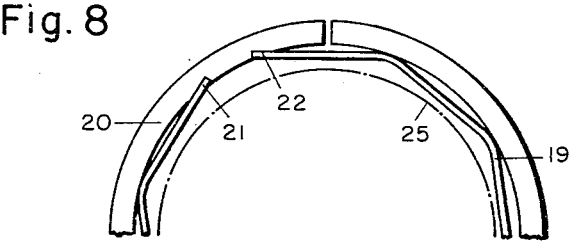
FIG. 8 shows by way of example the way in which the loading spring bears on the piston ring.

Another support of the loading spring 19 is illustrated in FIG. 8. As will be seen from the drawing the same abuts the piston ring 20. Laterally of the same butt end of the piston ring 20 two notches 21 are milled into the inside of the piston ring 20. The recesses thus formed are to be so designed that the loading spring 19 remains caught therein with its ends.

When using a flat strip of spring steel for making the loading springs it has been found that the effect of the loading spring can be considerably increased, when the rectangular profile of the spring strip steel is cambered or is substantially V-shaped or trapezium-shaped.

In particular, a uniformly good hugging of the piston ring by the loading spring is attained when the camber or the V-shaped or trapezium-shaped deformation of the steel strip is locally so determined that the spring steel strip is flat at the corners of the initial polygon and accordingly only the sides of the initial polygon are cambered or made V-shaped or trapezium-shaped.

In FIGS. 9–13 of the accompanying drawing some profile shapes are illustrated by way of example.

As shown in FIG. 9, the loading spring has a cambered profile, while FIG. 10 shows a V-shaped profile. Of the two legs of the V-profile each may be cambered in itself, as shown in FIG. 11. According to the embodiment of FIG. 12 the profile 12 is trapezium-shaped. Obviously also the bridge connecting the two free legs may be cambered (see FIG. 13).

Further profile shapes are conceivable, for example W-shaped as shown in FIG. 14, but substantially always a V-shaped or trapezium-shaped formation is used.

While I have described herein and illustrated in the accompanying drawings what may be considered typical and particularly useful embodiments of my said invention, I wish it to be understood that I do not limit myself to the particular details and dimensions described and illustrated; for obvious modifications will occur to a person skilled in the art.

What I claim as my invention and desire to secure by Letters Patent is:

1. A piston ring assembly adapted to be received in the grooves of a piston, comprising a piston ring mounted in the groove of said piston to seal the same, a loading spring mounted in the groove of the piston and disposed out of contactual engagement with the bottom wall of the groove in said piston, and bearing against the piston ring at circumferentially spaced apart locations, said spring having its ends arranged to abut one another at least in the compressed state of said spring, said spring in its uncompressed state having the form of an $n$-sided convex polygon with its edges bearing on the piston ring and the portions of the spring forming the polygon sides being adapted to buckle outwardly with increasing inwardly directed radial pressure on the piston ring.

2. A piston ring assembly according to claim 1, characterized in that with the increasing radial pressure on the piston ring the spring assumes the shape of a small $m,n$-sided polygon bearing with $m,n$-edges on the piston ring.

3. A piston ring assembly according to claim 1, characterized in that the cross-section of the spring is transversely cambered at least along a part of the length of the spring.

4. A piston ring assembly according to claim 2, characterized in that the portions of the spring forming the polygon sides are slightly convex.

5. A piston ring assembly adapted to be received in the grooves of a piston, comprising a self-contained unit including a piston ring mounted in the groove of the piston to seal the same and a loading spring arranged internally of the piston ring, said spring being out of contactual engagement with the bottom wall of the groove in said piston and arranged to bear against the inner periphery of the piston ring at circumferentially spaced apart locations, said spring being in the form of an $n$-sided convex polygon when in its uncompressed state with its edges bearing on the piston ring and the portions of the spring forming the polygonal sides being adapted to buckle outwardly with increasing inwardly directed radial pressure on the piston ring.

6. A piston ring assembly as set forth in claim 5 in which the ends of said spring abut one another in the compressed state of said spring.

7. A piston ring assembly as set forth in claim 5 wherein the piston ring is provided on its internal surface with a pair of notches on one side of the butt joint of said ring, and the ends of said spring are received in said notches.

8. A piston ring assembly as set forth in claim 5 in which said loading spring is formed of spring strip material.

9. A piston ring assembly as set forth in claim 5 in which said loading spring is of round section and made of spring wire material.

10. A piston ring assembly as set forth in claim 5 wherein said loading spring is made of spring strip metallic material transversely cambered in at least local areas.

11. A piston ring assembly as set forth in claim 5 in which a lock is arranged within said piston ring having a through opening and the ends of said loading spring being received in and guided within said opening.

12. A piston ring assembly as set forth in claim 5 wherein said loading spring forms a closed polygon in the loaded and unloaded state.

13. A piston ring assembly as set forth in claim 12 in which the butt joint of said piston ring is bridged over a polygon side of said spring.

14. A piston ring assembly as set forth in claim 12 wherein the butt joint of said piston ring coincides with a polygon corner of said spring.

15. A piston ring assembly as set forth in claim 12 wherein the polygon sides are convexly curved in an outward direction.

16. A piston ring assembly as set forth in claim 12 in which the polygon sides are of less buckling strength in an outward direction than in an inward direction and under radial pressure applied to the polygon corners buckle outwardly forming additional support points engaging the internal surface of the piston ring between the polygon corners.

17. A piston ring assembly as set forth in claim 12 in which said loading spring in its unloaded condition forms an $n$-sided polygon and in its loaded condition forms an $m,n$-sided polygon with $m$ and $n$ being integers.

References Cited in the file of this patent

UNITED STATES PATENTS

| | | |
|---|---|---|
| 1,869,108 | Marien | July 26, 1932 |
| 2,854,301 | Lutz | Sept. 30, 1958 |
| 2,904,276 | Shepard | Sept. 15, 1959 |